No. 853,208. PATENTED MAY 7, 1907.
F. H. RICHARDS.
TYPOGRAPHIC MACHINE.
APPLICATION FILED APR. 12, 1902.

12 SHEETS—SHEET 3.

Witnesses
F. C. Fliedner.
H. Jacobs.

Inventor,
F. H. Richards.

No. 853,208. PATENTED MAY 7, 1907.
F. H. RICHARDS.
TYPOGRAPHIC MACHINE.
APPLICATION FILED APR. 12, 1902.
12 SHEETS—SHEET 4.
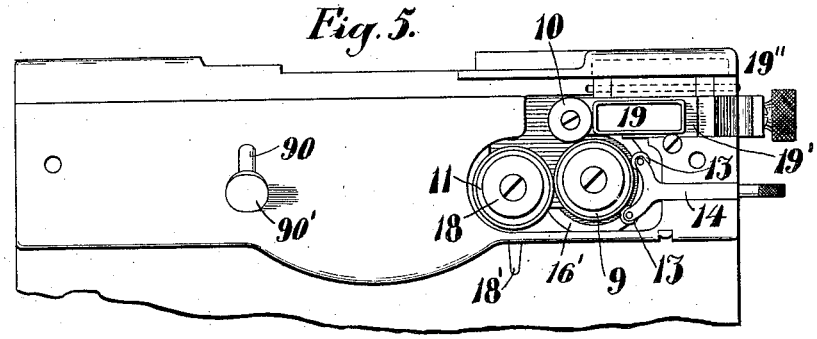
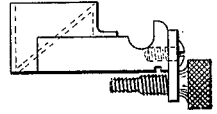
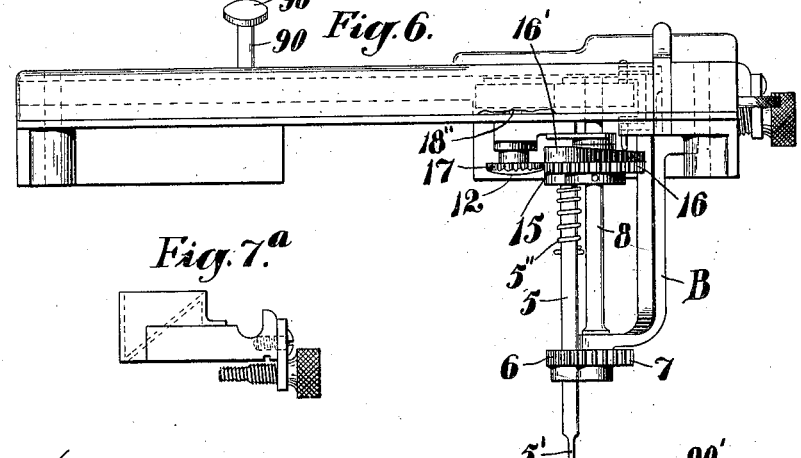
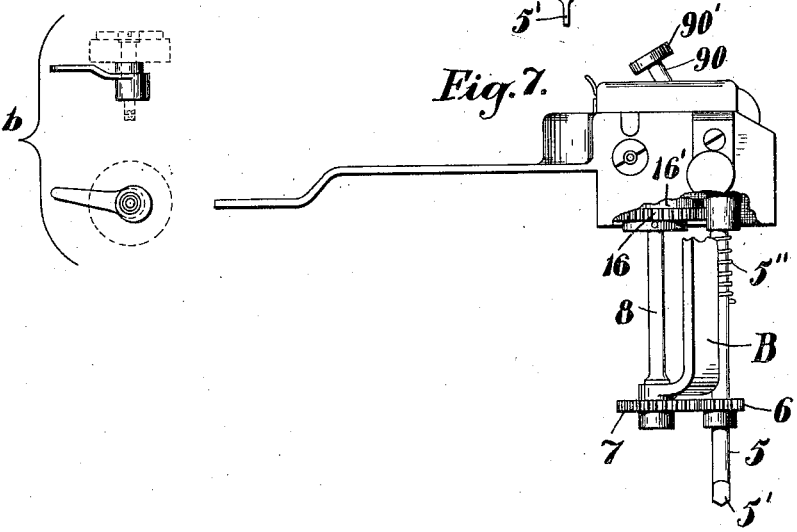
Witnesses:—
F. C. Fliedner.
H. Jacobs
Inventor,
F. H. Richards No. 853,208. PATENTED MAY 7, 1907.
F. H. RICHARDS.
TYPOGRAPHIC MACHINE.
APPLICATION FILED APR. 12, 1902.
12 SHEETS—SHEET 5.
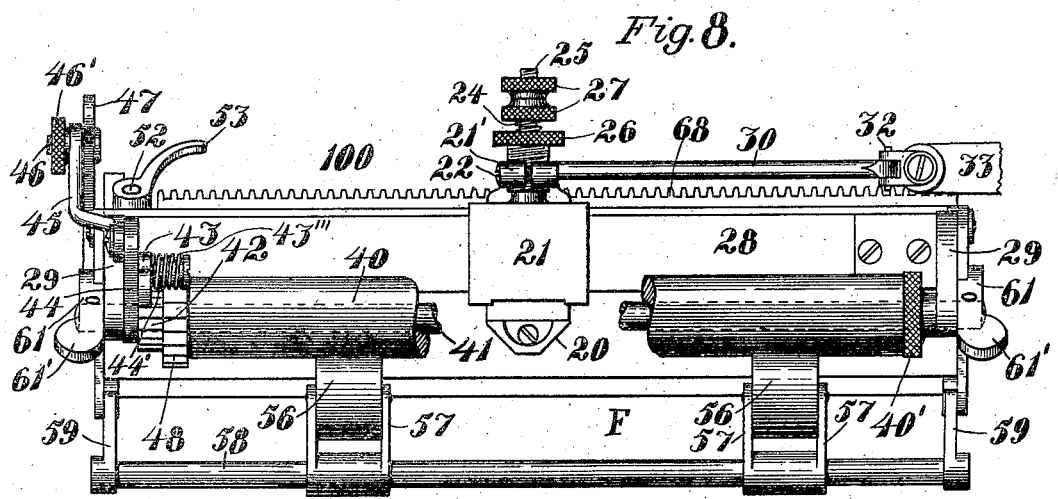
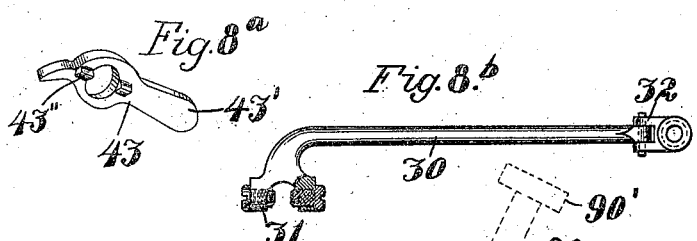
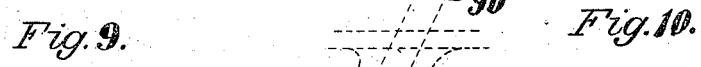
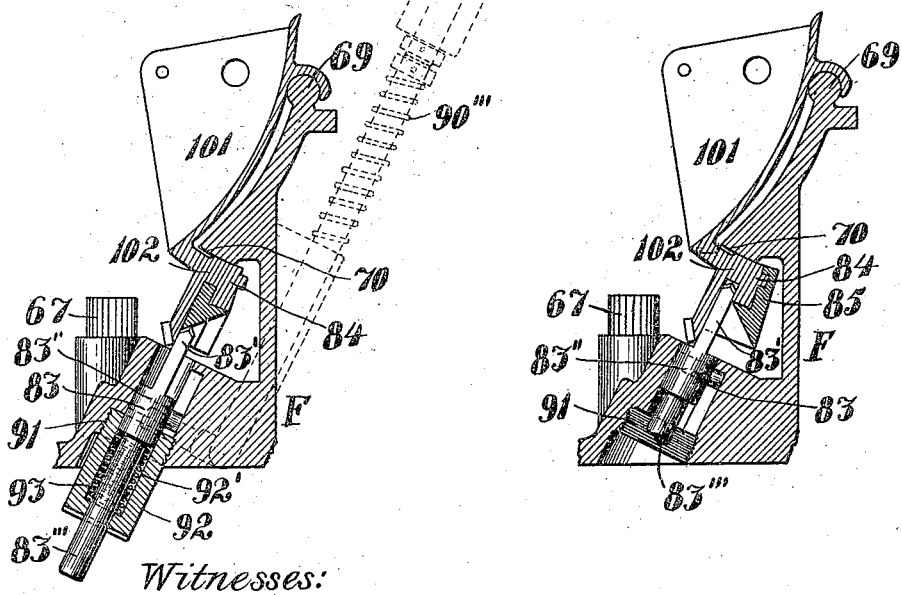
Witnesses:
John L. Edwards Jr.
Fred. J. Dole.
Inventor:
F. H. Richards

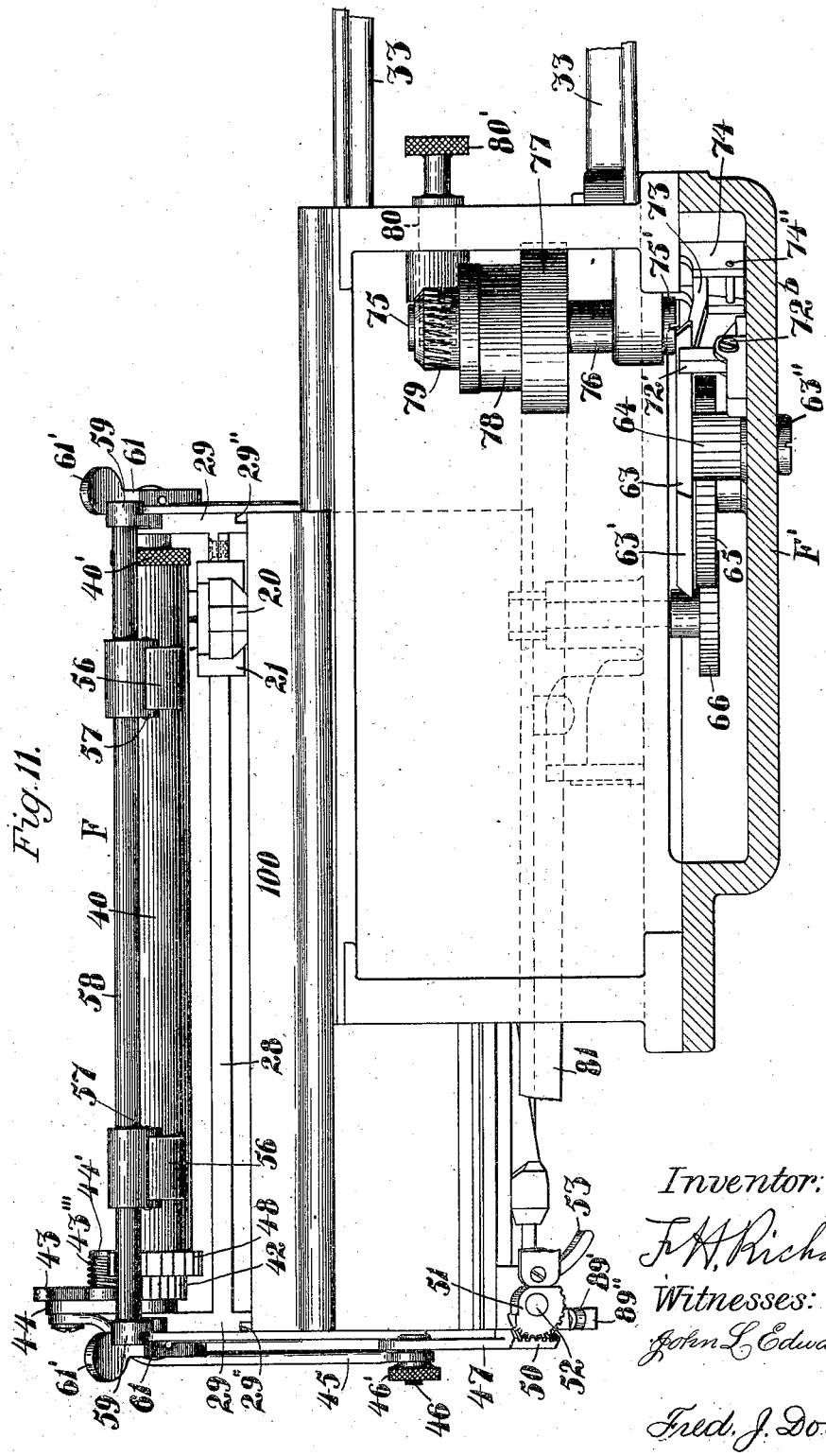

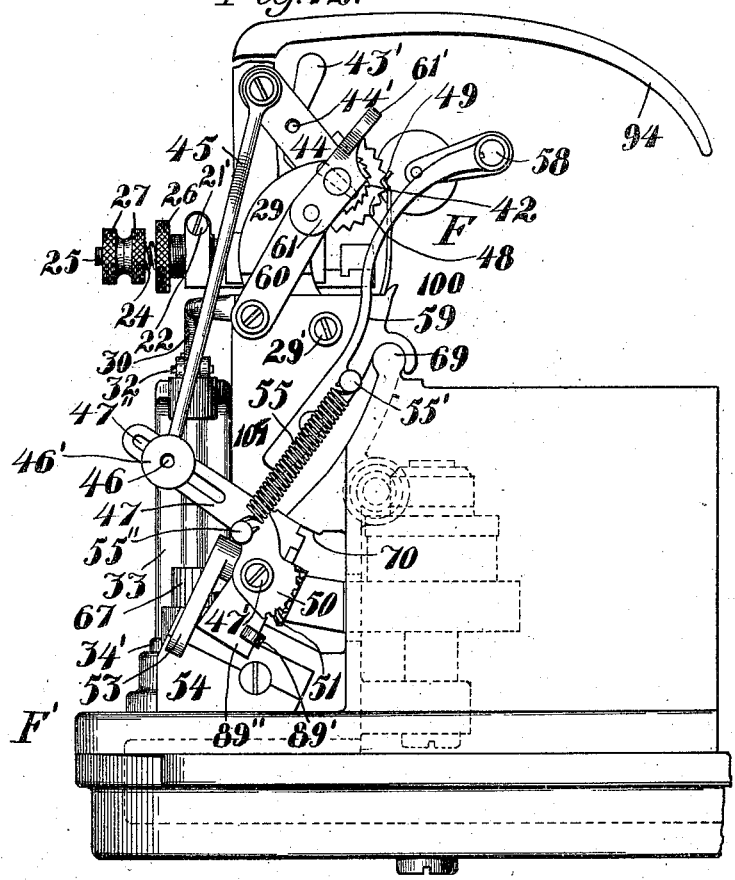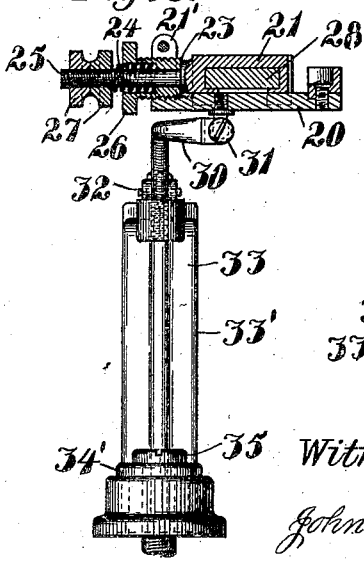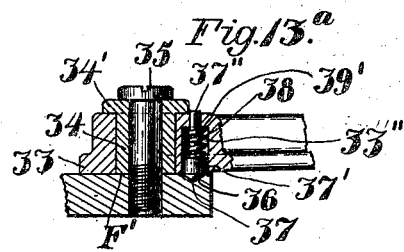

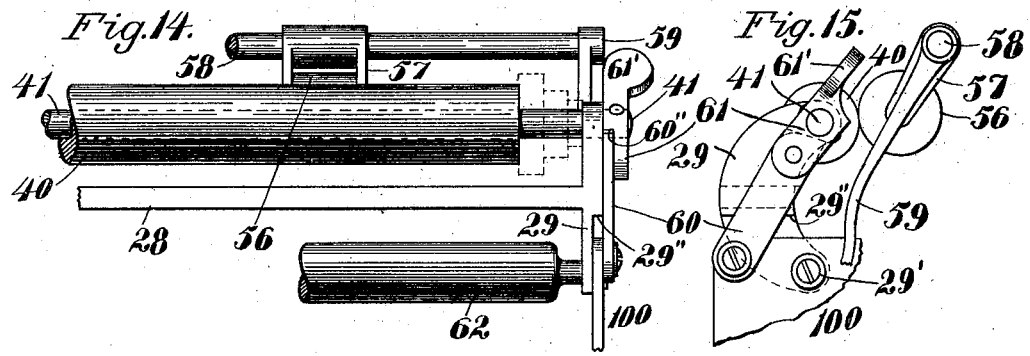
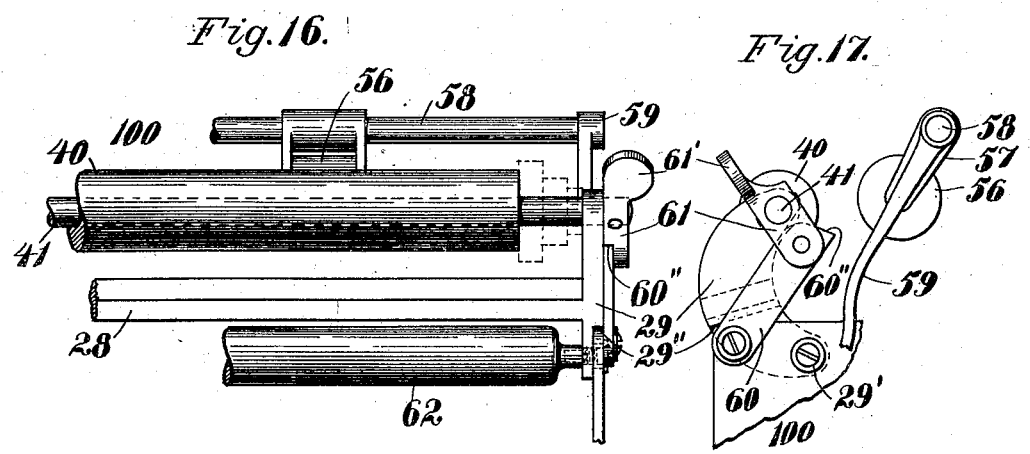
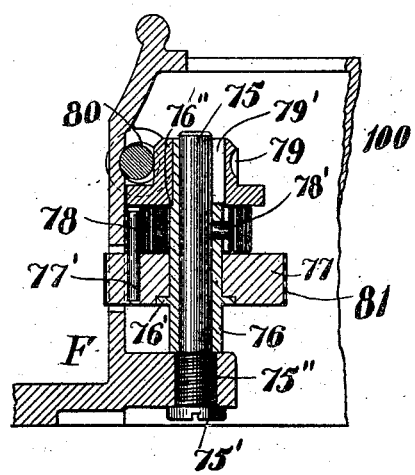

No. 853,208. PATENTED MAY 7, 1907.
F. H. RICHARDS.
TYPOGRAPHIC MACHINE.
APPLICATION FILED APR. 12, 1902.
12 SHEETS—SHEET 9.
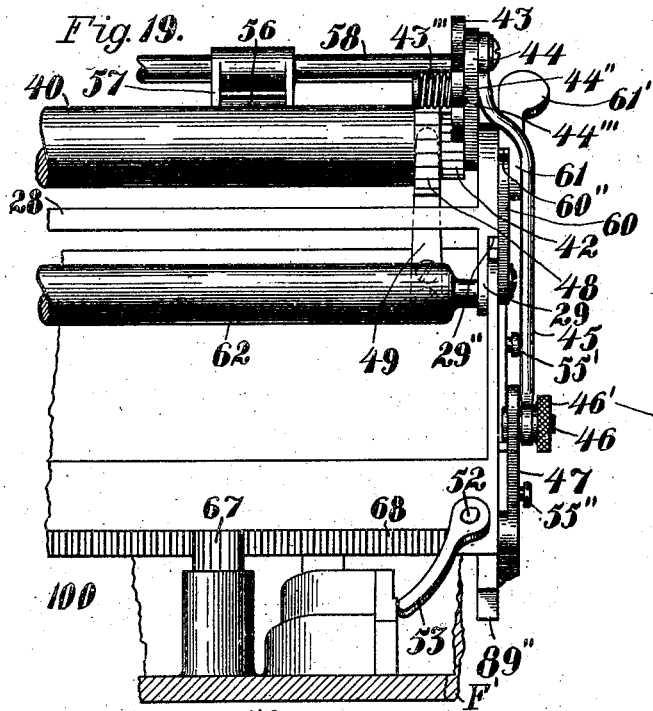
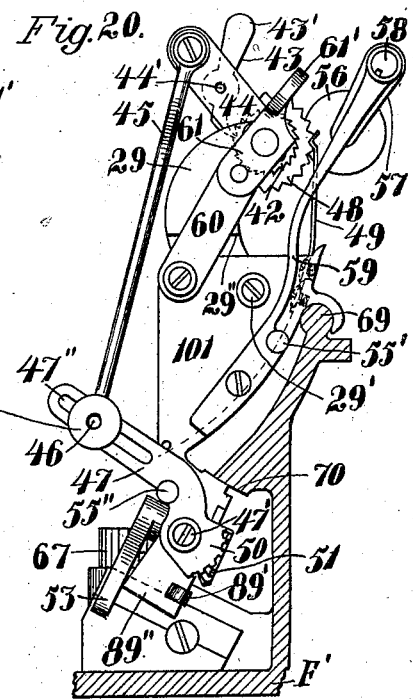
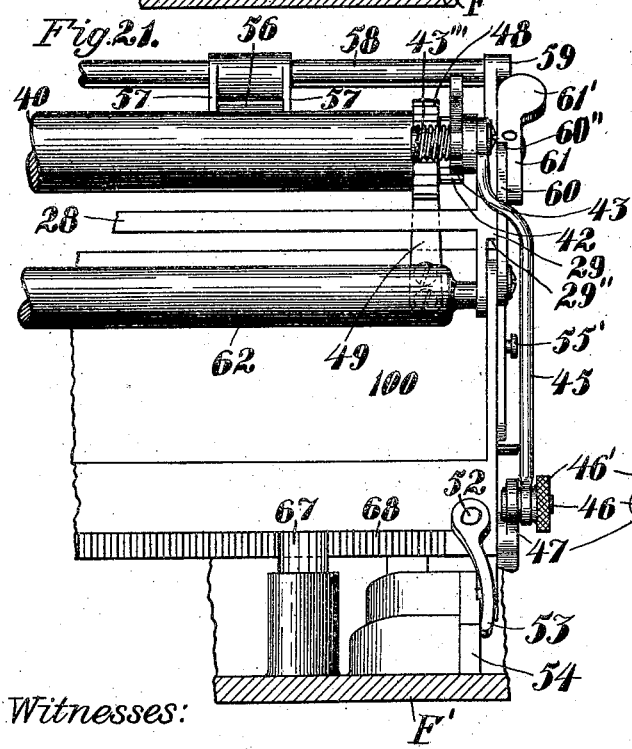
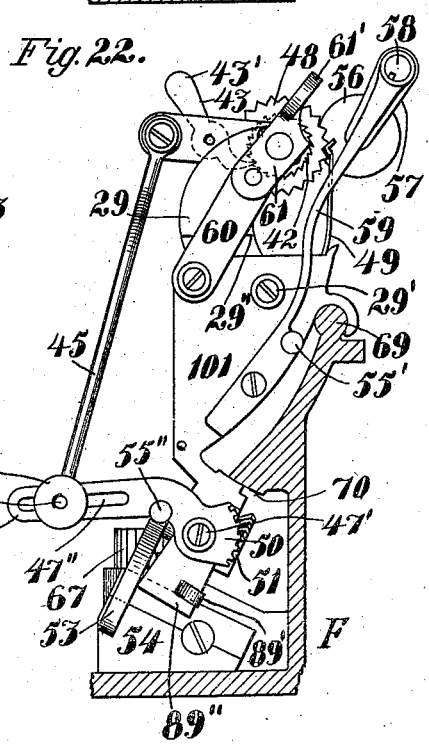
Witnesses:
John L. Edwards Jr.
Fred. J. Dole.
Inventor:
F. H. Richards No. 853,208. PATENTED MAY 7, 1907.
F. H. RICHARDS.
TYPOGRAPHIC MACHINE.
APPLICATION FILED APR. 12, 1902.
12 SHEETS—SHEET 10.
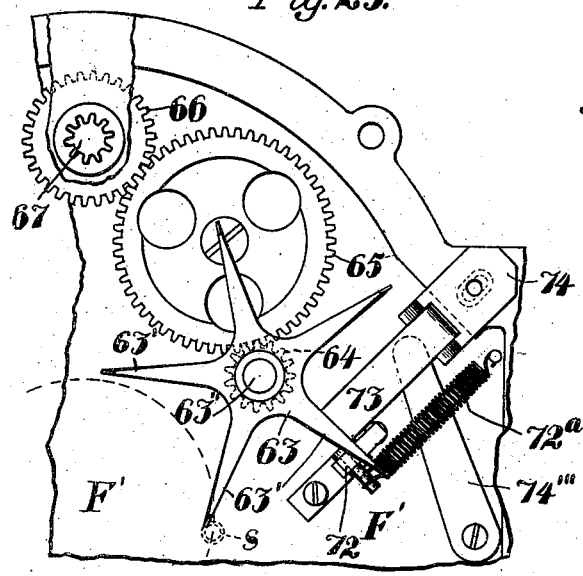
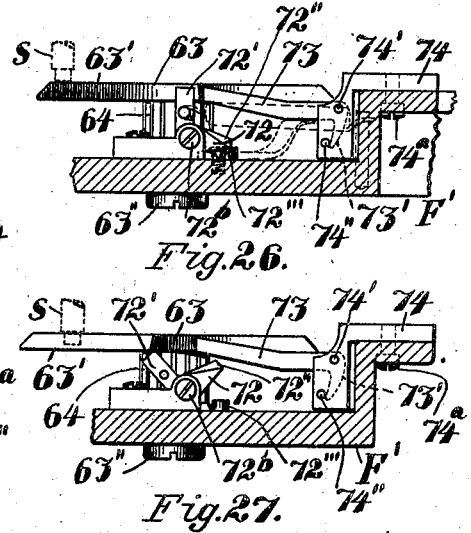
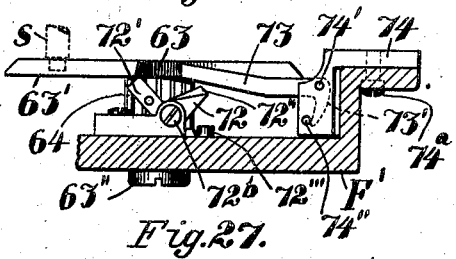
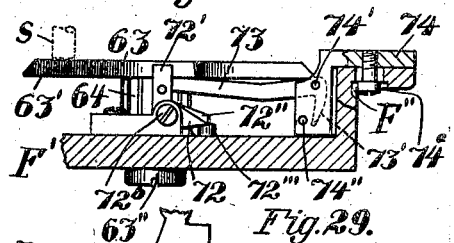
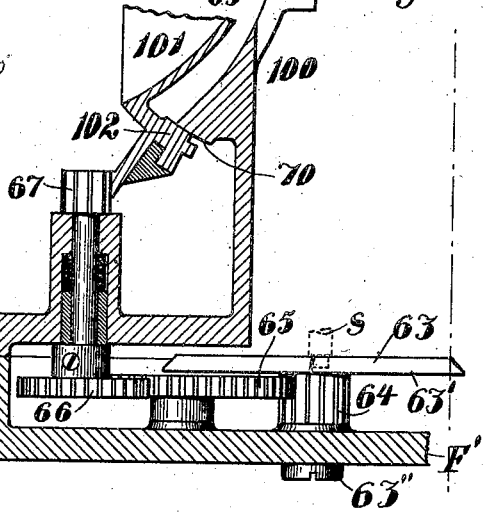
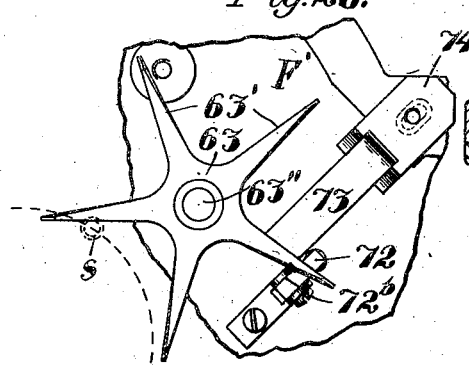
Witnesses:
John L. Edwards Jr.
Fred. J. Dole.
Inventor:
F. H. Richards

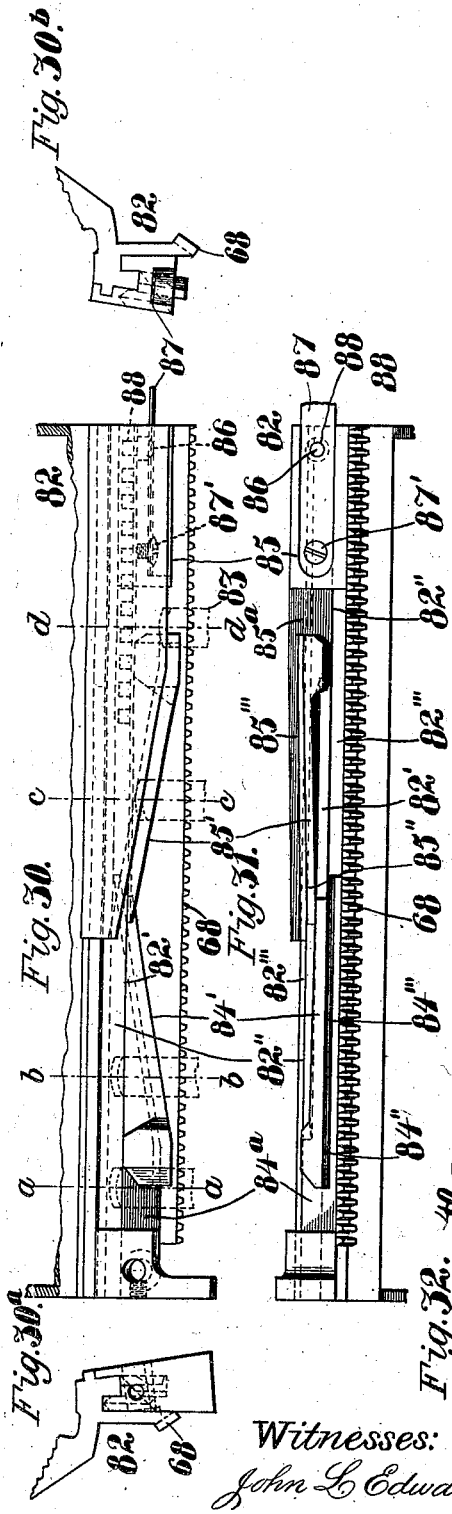
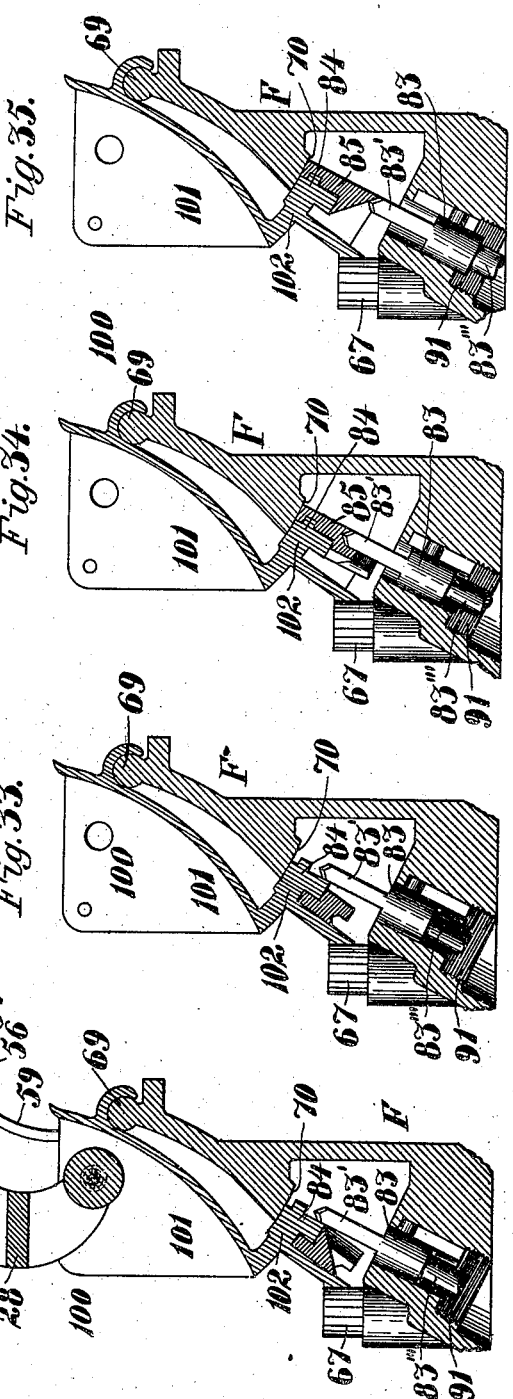

No. 853,208. PATENTED MAY 7, 1907.
F. H. RICHARDS.
TYPOGRAPHIC MACHINE.
APPLICATION FILED APR. 12, 1902.

12 SHEETS—SHEET 12.

Witnesses:
John L. Edwards Jr.
Fred. J. Dole.

Inventor:
F. H. Richards

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

TYPOGRAPHIC MACHINE.

No. 853,208.     Specification of Letters Patent.     Patented May 7, 1907.

Original application filed December 29, 1900, Serial No. 41,521. Divided and this application filed April 12, 1902. Serial No. 102,539.

*To all whom it may concern:*

Be it known that I, FRANCIS H. RICHARDS, a citizen of the United States, residing at Hartford, in the county of Hartford and State of Connecticut, have invented certain new and useful Improvements in Carriage Devices for Typographic Machines, of which the following is a specification.

This invention relates to typographic machines and has for an object to provide improved carriage mechanisms for such machines.

This invention is a division of my application for patent for typographic machines filed December 29th, 1900, Serial No. 41,521.

Figure 1:
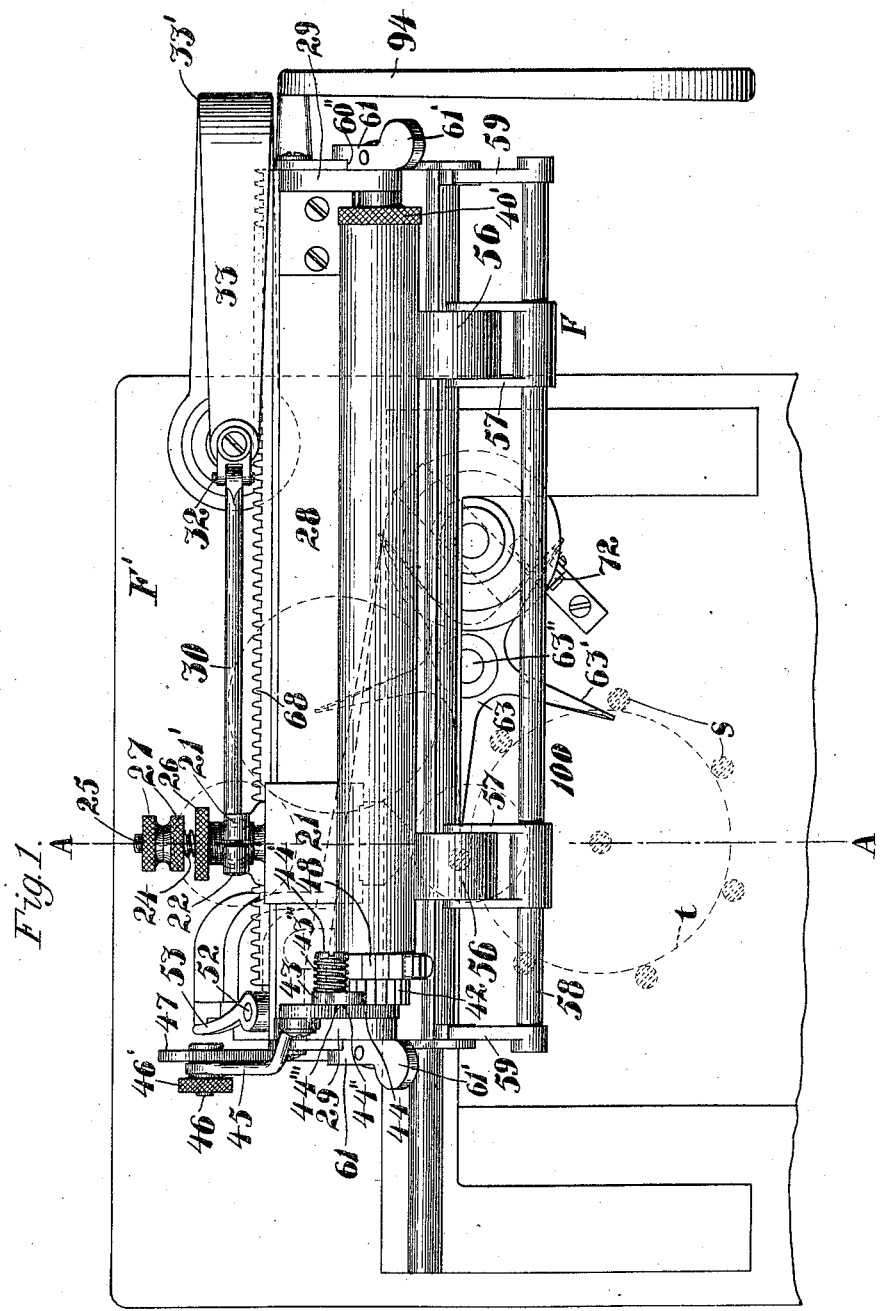
Figure 2:
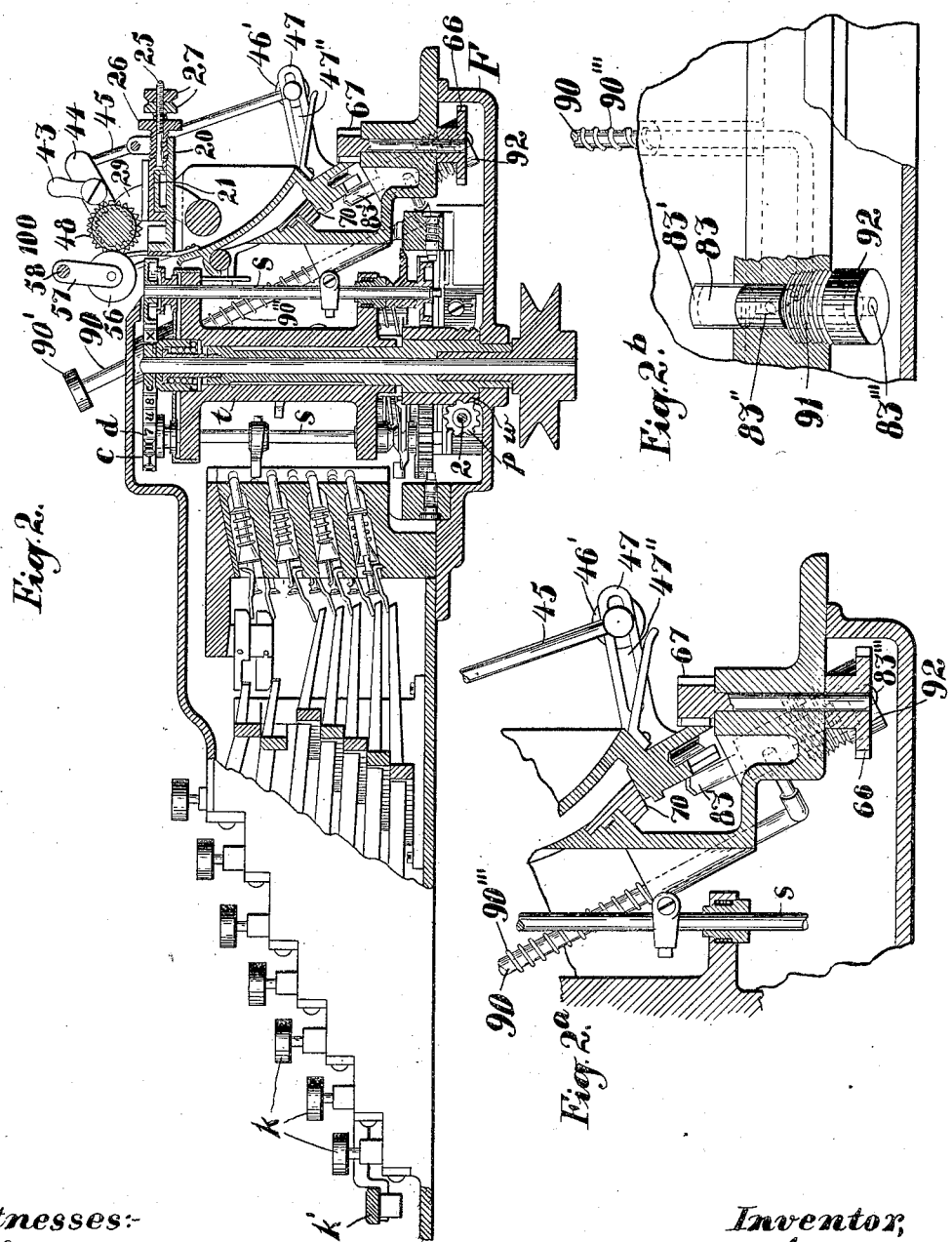
Figure 3:
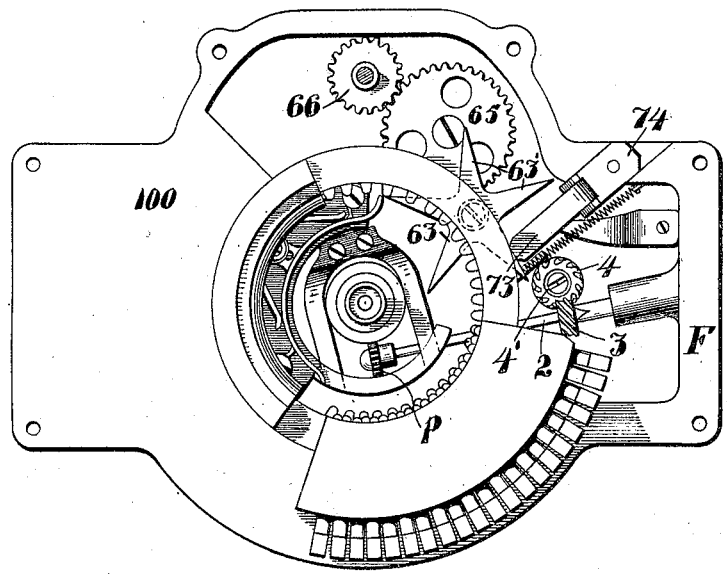
Figure 4:
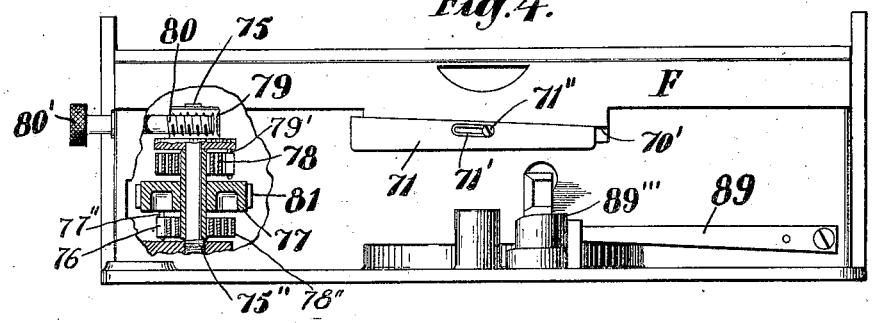
Figure 36:
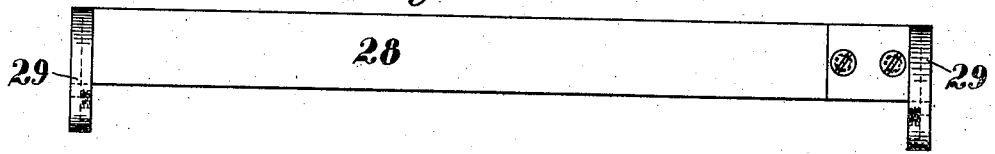
Figure 37:
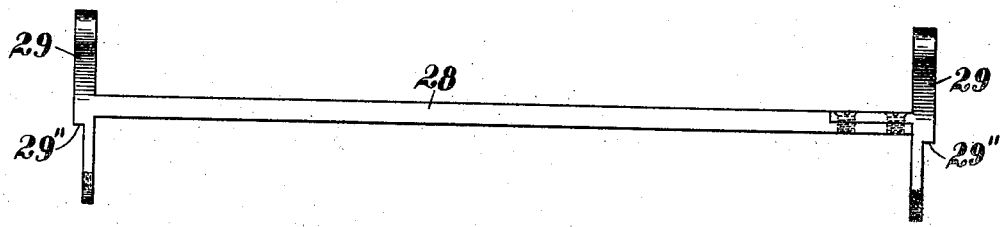
Figure 38:
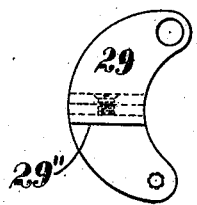
Figures 39, 40:
Figure 41:
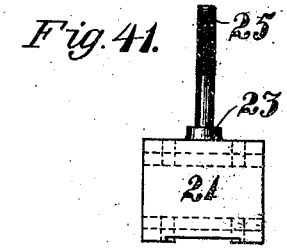
Figure 42:
Figures 43, 44:
Figure 45:
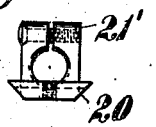
Figure 46:
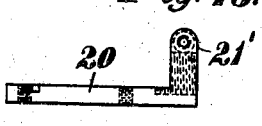

In the drawings which form a part of this specification, Figure 1 is a top plan view of a carriage, of certain members mounted thereon, and of a part of the operative mechanism thereof; a shaft, a rotatable turret mounted thereon, and axially movable shafts mounted on said turret, being locatively indicated by broken lines. Fig. 2 is, in part, an end elevation; but, principally a vertical longitudinal section, of a complete machine; as the latter is shown and described in my former application herein-after referred to. The machine being considered as normally positioned relative to a personal operator, this figure is taken as from the right thereof, and the section shown is taken on a median line of the machine, as at A—A, Fig. 1. Figs. 2ª and 2ᵇ, are fragmentary views of certain details of the machine. Fig. 3 is a top plan view; in part, of details more immediately connected with the invention as shown and described in said former application, and, in part, of details of the inking and letter-spacing mechanisms which illustrate, herein, a form of my present invention. Fig. 4 combines rear elevations of a carriage guideway and of a part of the locking-device for the letter-spacing mechanism; with a vertical section of a part of the mechanism which returns the carriage to a prime, or line-beginning position. Figs. 5, 6 and 7 are, respectively, a top plan view, a front elevation and a right-hand elevation of the inking mechanism, and Figs. 7ª and 7ᵇ, respectively, are details thereof. Fig. 8 is a top plan view of the carriage, and of parts mounted thereon; a portion of the feed-roller being removed in order to show the platen more fully. Figs. 8ª and 8ᵇ are views of details, as shown in Fig. 8. Figs. 9 and 10 are fragmentary vertical sections in which are shown the letter-spacing rack and pinion, and, in different positions, the locking-pin of the letter-spacing mechanism. Fig. 11 is a front elevation of the carriage and parts mounted thereon; of the carriage guideway; the carriage-returning mechanism; and of the letter-spacing mechanism. Fig. 12 is an end elevation, looking from the left of the machine; and shows the frame supporting the carriage; the carriage guideway formed on said frame; the carriage and members mounted thereon; and line-spacing mechanism. Fig. 13, is a combined left-hand elevation of a platen-retaining bracket and link; and a vertical longitudinal section of the platen, and parts immediately connected therewith. Fig. 13ª is a section of a detail of the platen-retaining bracket. Figs. 14 to 17, inclusive, severally illustrate various positions assumed by the impression-receptive material engaging mechanism. Fig. 18 is a vertical section of a part of the frame and carriage guideway, and of the spring-tension adjusting and spring-operative members of the carriage-returning mechanism. Figs. 19 to 22, inclusive, severally illustrate various positions assumed by the line-spacing mechanism; or that mechanism which moves the impression-reception material in a direction longitudinally thereof. Figs. 23 to 28, inclusive, severally illustrate various positions assumed by the letter-spacing mechanism; or that mechanism which moves the impression-receptive material in a direction transversely thereof. In these figures, the adjustive members for precisionizing the intermittent movements of the letter-spacing mechanism, are also shown. Fig. 29 is a vertical section of a portion of the carriage; and also of a portion of the frame; and an elevation of the rotative members of the letter-spacing mechanism mounted on the latter. Figs. 30 and 31, are, respectively, a rear elevation and a bottom plan view of the locking-rail and line-spacing rack. Figs. 30ª and 30ᵇ, respectively, are end elevations of a part of the carriage. Figs. 32 to 35, inclusive, severally illustrate vertical transverse sections of the frame, the carriage, the line-spacing rack, and of the locking rail; said sections being severally taken at the lines *a—a*, *b—b*, *c—c*, and *d—d*, Fig. 30, respectively; the letter-spacing pinion and the locking-pin which engages the locking-rail, being shown in elevation in said Figs. 33 to 35, inclusive. In Fig. 32, is also shown, in transverse section, the feed-roll and shaft, the platen guide-rail and a pressure-roll and other members; and also, in side elevation, a link which supports one end, each, of the feed-roll and of the platen guide-rail. Figs. 36 and 37 are, severally, a top plan view and front elevation, respectively, of a platen guide-rail. Fig. 38 is a side elevation of one of the links which support the platen guide-rail and the feed-roll. Fig. 39 is a similar view of a pressure-roll supporting bracket, and Fig. 40 is a central longitudinal section thereof. Figs. 41 to 46, inclusive, are, severally, views of the impression platen, platen-guide and other members intimately connected therewith.

By referring to Figs. 1, 2 and 3, it will be seen that in order to introduce certain kinetic elements in connection with the before-mentioned mechanisms, I have shown complementary mechanisms, for which I have heretofore applied for Letters Patent; the application having been filed on the 29th day of December, 1900; Serial Number 41,521. These kinetic elements, so far as they may relate to the invention more immediately connected with this application, may be said to include a rotatable turret carrying independently rotatable shafts reciprocatably mounted in said turret, and axially parallel with a shaft, on which said turret is mounted; impression device carriers, severally mounted on said independently rotatable shafts, respectively; and a spiral gear wheel mounted on and rotating with said turret.

The other elements herein shown and described may, in a general way, be said to include a reservoir for ink; mechanism for equalizing the distribution of said ink upon the peripheries of rollers, priorly to the application thereof to the impression devices, and mechanism for effecting such application of the properly distributed ink; for which see, more particularly, Figs. 5 to 7$^b$, inclusive; also a resiliently adjustable platen for receiving the impact of impressions made by the impression-devices; for which see, more particularly Figs. 8 and 11, and also 41 to 46, inclusive; also, mechanism for feeding impression-receptive material, in two, several, directions, relative to the impression-devices; devices for disengaging the several feeding mechanisms; and also kinetic connections from the several enumerated mechanisms to the before-mentioned turret.

In order to identify elements shown in my application precedent hereto and hereinbefore referred to, distinctively from elements more immediately connected with this application, small, or so-called "lower-case" letters will be used solely as reference marks for the former only. The reference marks used herein, are, relatively, alike throughout this specification.

The turret *t*, may be rotated by any suitable means. (Not shown.) The independently rotatable shafts *s*, may be selectively and variably rotated, and also reciprocated axially, by means of the rotation of the turret *t*, combined with the operations of mechanisms fully described in the before-mentioned application; the operations of said mechanism being selectively originated by manipulations of keys *k*. Also, by the rotations of the turret *t*, when combined with a downward reciprocation of a shaft *s*, two other separate and distinct results may be obtained; namely, a dual movement of a carrier *c*, effecting, ordinarily, the presentation of a preselected device mounted thereon, at the normal position for an impression to be made thereby; and an engagement of the downwardly-projecting shaft-end, with an actuator 63, which, in form, may be a "star-wheel," commonly so-called, and which may operate a train of letter-spacing mechanism, as will be, hereinafter, more fully related. The operation of the carrier *c*, and the mechanism therefor, will be found more fully described in the application precedent hereto and hereinbefore mentioned.

Yet another kinetic connection is made with the turret *t*; namely, by means of a spiral gear wheel *w*, which meshes with a spiral pinion *p*, mounted on and rotating a shaft 2, on which is also mounted a second spiral gear wheel 3, which meshes with a spiral gear wheel 4, journaled, by a hub thereon, in the framework F, of the machine. The wheel 4 has a socket 4', formed axially thereof; and is thereby adapted to receive, and to engage for rotation, a flattened end 5', of a spindle or shaft 5; the end 5' being retained in said socket 4', by a spring 5''. On the shaft 5, is mounted a gear wheel 6, rotating therewith and meshing with a gear wheel 7, mounted on and rotating with a shaft 8, which is journaled in a bracket B, and is laterally movable at its upper portion, where it carries an ink-distributing roller 9, which peripherally contacts with an ink-conveying roller 10, and with an ink-applying, or inking roller 11; the latter being mounted on the upper end of a shaft 12. Contact of the peripheries of the inking-roller 11, ink-distributing roller 9, and ink-conveying roller 10, may be maintained by means of pressure-rollers 13, 13, mounted in bearings in a forked member 14, and pressed against the roller 9, by a spring. (Not shown.) The peripheral surfaces of the ink-rollers should be formed of material properly adapted to the uses for which they are designed. The rollers 9 and 11, are shown as rotatable in opposite directions by means of suitable gearing, herein shown as gear-wheels 15, 16 and 17; the wheel 15, being mounted on the shaft 5; the wheel 16, being an intermediate, meshing with the wheel 15, and with the wheel 17, which is shown as being mounted on the shaft 12. The wheel 16, has a radial flange 16'; on a cam surface whereof rests an end of the pivot of each pressure roller 13, 13; the latter being thus reciprocated axially of the ink-rollers; thus effecting a more equal distribution of the ink on the latter. The inking roller 11, may be journaled in an eccentric sleeve 18, mounted on an arm 18', which latter may extend through a slot 18'', to an accessible position outside of the frame F. One edge of said slot has a number of depressions, into any one of which the arm 18' may engage, in order to effect by means thereof, and of the eccentric sleeve 18, any desired adjustment of the inking-roller 11, relative to the impression devices d. An ink-font 19, mounted on a slide 19', may preferably contain printer's-ink, only: this machine being more particularly designed for the use of the latter; although any suitable substance, or an absorbent material charged therewith, may be used in lieu thereof. The ink, or ink-saturated substance may be exposed at an opening in the font 19, where it may contact with the ink-conveying roller 10, and said contact may be adjusted by means of a differential thumbscrew which engages in female screw-threads, in the frame F, and font 19, respectively. The inking mechanism, collectively, may, for convenience sake, be mounted in an appurtenance 19'', and by reason of such mounting may be readily removed from the machine; either engagement or disengagement of the drive-shaft 5, thereof, with a driving member, such as 4, being readily effected by means of the shaft end 5', and the socket 4'.

A type, or impression-device d, being inked as aforesaid, if it be intended to print in color therewith, or otherwise left uninked, may be impressed on, against or into the impression-receptive material, such, for instance, as paper; and, for this purpose, said material may be interposed between said impression-device d, and a platen 20, which may be mounted in a guideway formed in a member 21, which may embrace and be supported upon a guide-rail 28, which may be secured, preferably at each end thereof, to links 29, 29, pivotally attached at 29', to the carriage 100. As shown, the member 21, is mounted transversely of the carriage 100, and the platen 20, may be urged toward the impression devices d, and against a stop 23, by a spring 24, which is mounted on a screw stud 25, which also passes through an adjustable tubular thumbscrew 26, and is tapped into the platen 20. The thumbscrew 26, is peripherally grooved near its inner end, and, at that part, may be located between fixed curved jaws which may be integral with the platen 20. The screw-threaded body of the thumbscrew 26, may engage with a female screw-thread formed in a clamp-nut 21' which may be integral with the platen guide-member 21, and be furnished with a clamping screw 22, mounted in the usual manner, to clamp the nut 21' on the thumbscrew 26, and thus prevent the latter from rotating. A pair of adjustable jam-nuts 27, 27, may be mounted near the outward end of the screw 25, and serve to regulate the tension of the spring 24, which abuts against one of them and also against the outward end of the thumbscrew 26. The impact-receiving face of the platen 20 may normally lie on, or approximately near, the plane of the rear surface of the impression-receptive material.

By the operation of the mechanism thus described, a resiliently-operative surface is presented to receive the impact when an impression is being made; the amount of resilience of such operation may be regulated at will; and a separate adjustability is available for regulating the force of the impact apart from the resilience thereof.

As the guide-rail 28, as shown, moves with the carriage 100, transversely of the machine; and as it is necessary that the platen 20, should be retained in a fixed position relative to said transverse motion, in order to properly receive the impact of the impression-devices, means for effecting such retention, may be provided as follows; (see, more particularly, Figs. 1, 12 and 13.) A link 30 may be hinged at one end thereof to the platen guide-member 21; and at the other end thereof, to a curved bracket 33, which may be located at one side of the machine. The bracket 33, may be pivoted to the frame F, and the curve 33', thereof, may be of such form and dimensions as to permit the carriage 100, to be moved to its extreme position nearest to the bracket 33, without contacting the latter. Referring now to Fig. 13ª, it will be seen that the pivot of the curved bracket 33, may in form, be a bush 34, furnished with a flange 34', and secured, by a binding-screw 35, passing therethrough, to the bed F' of the machine. The flange 34', serves to retain the bracket 33, in a rotatable position between said flange 34' and the surface of the bed F'. In the latter may be formed a conical recess 36, in which a conical detent 37, returnably operative by a spring 38, may be engaged. The conical detent 37, is formed on an end of a cylindrical body 37', which has a stem-portion 37'', around which the returning-spring 38 may be wound. The detent and spring may be mounted in a counter-bored cylindrical recess in the foot 33'', of the curved bracket 33; the spring 38, abutting, at one end, against the shoulder 39', in said recess, and, at the other end, against a shoulder on the detent-body 37'. Engagement of the conical detent 37, in the recess 36, may serve to retain the curved bracket in position to admit within the curve 33', a part of the carriage 100, when the latter is at its prime, or line-beginning position. At other times, the curved bracket 33, may be turned aside, if necessary, in which event the conical detent 37, will recede from the recess 36, and rest upon the surface of the bed F'. For reasons hereinafter set forth, the hinges 31, 32, connecting the link 30, to the platen 20, and to the bracket 33, respectively, are preferably formed as universal joints; (see, more particularly, Figs. 1 and 12, and Figs. 13 to 17, inclusive;) thus allowing to the carriage 100, with the platen guide-member 21, a rocking movement longitudinally of the machine.

Feeding movements of the impression-receptive material are provided for, in two directions, by this invention; and in the form shown herein as one illustration of the latter, one of said movements is designed to engageably introduce the impression-receptive material into the machine and to feed it longitudinally thereof; or so as to provide for successive lines of impressions which may be made transversely thereof, and comprises a roller feed, with suitable operative mechanism. The pivoted links 29, with the guide-rail 28, rigidly secured to each of them, form an oscillatable frame; (see, more particularly, Figs. 8 and 32.) Each link 29, has a projection or shoulder 29'', formed transversely thereof, which serves to contact with a suitably-formed surface on the frame F; thus limiting the oscillatory motion of the links 29, and of members mounted thereon. A feed roll shaft 41, is journaled in the links 29, at the free ends of the latter, and on the shaft 41, is rotatably mounted a feed-roll 40, which may be provided with a knurled collar 40', by which it may be manipulatively rotated. (See now, Figs. 1, 8, 8ª, 11, 12, 19 and 20.) To, and concentric with the feed-roll 40, is secured a feed-wheel 42; which is provided with ratchet teeth, and may be operated in intermittent partial rotations, by means of a pawl 43, which is provided with an arm 43', integral therewith, and is oscillatably mounted on a pivot 44', fixed on a lever 44, which, by its oscillations, serves to actuate the line-feed mechanism now being described. To the lever 44, is pivotally connected a link 45, which is also connected to a slotted lever 47, by means of a pivot 46, which, may be adjustable in the slot 47'', in the lever 47. The pivot 46, may be furnished with a knurled binding nut 46', by which it may be fixed in position when adjusted. The lever 47, is oscillatably mounted on a pivot 47'. By adjusting the pivot 46, and by means of the mechanism described, the intermittent partial rotations of the feed-wheel 42, and also of the feed-roll 40, to which it is secured, may be proportionately regulated. The pawl 43 may be retained in engagement with the teeth of the feed-wheel 42, by means of an angular lateral projection 43'', on one side of the former, which projection by means of a spring 43''', mounted on the pawl-pivot 44', is urged into an angular recess 44'', in the side of the lever 44, in order to effect a resilient coactive engagement of the latter with the feed-wheel 42, by means of the pawl 43. A second angular recess may be formed in the lever 44, as at 44''', into which the projection 43'', may be urged by the spring 43''', in order to prevent the pawl 43, from engaging with the teeth of the feed-wheel 42; the pawl-arm 43', serving as a manipulative means for effecting the engaging and disengaging operations described. A check-wheel 48, secured to, and mounted concentrically with the feed-wheel 42, may be provided with angular teeth, which, being engaged by a spring-detent 49, which is fixed to the frame F, may serve to prevent accidental rotative movement of the feed-roll 40, in either direction and to prevent a reverse movement thereof such as might otherwise be caused by the reverse movement of the pawl 43.

The line-spacing mechanism actuating lever 47, is of the first order, and the power-receiving arm thereof may in form, be a segment 50, of a miter-wheel, which meshes with a similar segment 51, which is mounted on an oscillating pivot 52, which is journaled in a pendent-member 101, of the carriage 100. An arm 53, is also fixed on the pivot 52, in such a position, that when the carriage 100, is moved from left to right, and approaches the limit of its movement, the arm 53 is intercepted by a stop 54, which is fixed to the bed F', of the machine, and causes the arm 53, to partially rotate the pivot 52, and miter-wheel segment 51, and, by means thereof, the miter-wheel segment 50, on the pivot 47', thus causing the lever 47, to oscillate and to operate the line-spacing mechanism. A returning-spring 55, of which one end is fixed, by a stud 55', to the carriage 100, the other end being attached by a stud 55'' to the load arm of the lever 47, serves to return the line-spacing mechanism to its zero, or non-operative position, and to maintain the arm 53, in position to contact with the stop 54. By moving forwardly the pawl-arm 43', the pawl 43, becomes disengaged from the teeth of the feed-wheel 42, and the feed-roll 40, may be rotated, in either direction, by means of the knurled collar 40'. By moving backwardly the pawl-arm 43' the pawl 43, is positioned to engage the teeth of the feed-wheel 42.

In order to render the feed-roll 40, functionally operative, pressure rolls 56, may be provided, designed to hold the impression-receptive material against the periphery of the feed-roll 40. The rolls 56, may be, in number, as many as may be required; but as shown, herein, they comprise two short rolls. The peripheries thereof, and of the feed roll 40, or of some of them, may be composed of rubber or some other elastic substance, in order to insure a feeding action thereof.

The pressure-rolls 56 (see, more particularly, Figs. 14 to 17, inclusive,) are severally rotatably mounted in frames 57, which are secured to a rod 58, to which, at the ends thereof, respectively, are secured resilient arms 59, which, severally, are fixed at each end, respectively, of the carriage 100. For the purpose of feedably engaging the impression-receptive material between the pressure-rolls 56, and the feed-roll 40, or for releasing said material from such engagement, the links 29, in which the ends of the feed-roll shaft 41, are secured, may be oscillated in order to move the feed-roll 40, toward or from the pressure-rolls 56. For this purpose, a pair of devices such as are commonly known as "toggle-joints," may be used; which may comprise the links 60 and 61, the links 60, being severally pivoted to the carriage 100, at a suitable distance transversely thereof, from the pivots 29', of the links 29. The links 60, are also severally pivoted to the links 61, respectively, the links 61, being severally pivoted to the respective ends of the feed-roll shaft 41. The links 61, are each provided with a finger-piece 61', by means of either of which the material-feeding device may be so operated that the impression-receptive material may be either engaged thereby or disengaged therefrom. As, for instance, when either finger-piece 61', is urged backwardly, the links 29, also swing backwardly and carry the feed-roll 40, away from the pressure-rolls 56; the links 60, meantime, assuming an angular position relative to the links 61. But when a finger-piece 61', is urged forwardly, the links 29, also swing forwardly bringing the feed-roll 40, toward the pressure-rolls 56, with considerable pressure, which increases as the joints formed of the links 60, and 61, approximate a straight form. The joints being carried slightly past the straight form, maintain their latter form by reason of receiving the lateral thrust of the links 60, 61, upon contacting shoulders 60", 60", which are severally formed on said links, respectively. A guide-roll 62, may be rotatably mounted in the carriage 100, in position, and serving to guide the impression-receptive material between the feed-roll 40, and the impression-rolls 56.

The remaining feeding movement for which provision is made by this invention, and to which allusion has hereinbefore been made, is designed to present the impression-receptive material in a plurality of positions transversely thereof; such presentations being, generally, successively effected, as, for instance, for the impressions, one after another, of the types of a typewriter; the positions thereof being, generally, contiguous one to another, save for space-intervals which lie between the impressed characters, and are generally left unoccupied in order to meet conventional requirements of typography. The organization of members effective for the feeding operation described may be termed "letter-spacing mechanism," and, generally, may be so operated as to feed the impression-receptive material by intermitting movements thereof; there being, ordinarily, between such movements, periods of rest, in each of which an impression may be made upon such material; and the distance to which the material is moved at each of said movements will ordinarily equal the linear dimension of the impressed character, plus that of an inter-character space-interval.

In the organization shown herein as an illustration of my present invention, the letter-spacing mechanism comprises in part, a carriage for the impression-receptive material, shiftable in both directions, transversely of the machine; a toothed rack fixed upon said carriage, and a gear-pinion meshing into said rack, for shifting said carriage according to the requirements of the letter-spacing operation; means for engaging said pinion with, and for disengaging it from said rack; a flexible member connecting said carriage to a spring-operated drum, for returning said carriage to a line-beginning position; an adjustable stop for the letter-spacing mechanism; means for adjusting, with precision, the impression-receiving position of the impression-receptive material; and means for disengaging the letter-spacing mechanism at any position of the carriage and thus permitting the latter to be moved in a reverse direction by the returning mechanism before referred to; or, by hand, in either direction.

Allusion has hereinbefore been made to the operative connection of the turret t, (see Fig. 1,) in combination with a downwardly-projecting shaft mounted therein, with an actuator 63, which, in form, may be a "star-wheel", commonly so-called, and by this latter term said actuator 63, will hereinafter be designated. (See now, Figs. 23 to 29, inclusive.) Said star-wheel, herein referred to as 63, is rotatably mounted on a stud 63", screwed into the bed F', of the machine, in such position that the star-wheel arms 63' may move into the path of, and be consecutively engaged by, a shaft s, carried by the rotative turret t, as before mentioned; and, by means of the rotation of said turret t, the star wheel 63, may either be partially or wholly rotated, as the latter may be engaged by either one or a plurality of the shafts s. Each several engagement of a shaft s, and a star-wheel arm 63', may operatively effect a movement of the carriage 100, transversely of the machine, to the extent of a single letter-space, by means of a train of wheels in which a gear-pinion 64, which is pivoted with and rotated by the star-wheel 63, meshes with an intermediate gear-wheel 65, which meshes with and rotates a gear-wheel 66, with which is pivoted and rotates a gear-pinion 67, which meshes with a toothed rack 68, mounted longitudinally of a pendent-member 101, of the carriage 100.

By again referring to my prior application, hereinbefore referred to, it will be seen that a shaft s, may be depressed in the turret t, and the latter may then be rotated, without necessarily functionally operating an impression device. Therefore, should it be desired to so operate the letter-spacing mechanism as to leave blank spaces on the impression-receptive material, as, for instance, between words, the desired object may be attained by the operation of certain keys k' in the key-board k, shown in Fig. 2; by which said operation, the necessary spacing result may be obtained apart from any impressing operation.

For letter-spacing operation, the carriage 100, is movable on a guideway 69, (see, more particularly, Figs. 4, 9, 10, 11 and 12,) which may be integral with the frame F, and of suitable form to permit the carriage 100, to oscillate thereon, transversely thereof, or longitudinally of the machine; in which event, oscillatory movement of the platen guide-member 21, is provided for by the particular forms of the joints 31 and 32, of the link 30. Considered relatively to the general position of the machine as shown in the drawings, the carriage 100, may be said to have a pendent member 101 which may be integral therewith, and to hang on the guideway 69, being retained thereon, however, by the engagement of a ledge 102, which projects from the pendent member 101, and engages a retaining face 70, which may be integral with the frame F, and parallel with the guideway 69. In the form shown in the drawing, however, the retaining face 70, may be formed on an adjustive angular member 71, slotted, as at 71'; movable longitudinally of a complementary angle-face 70', of the frame F, and secured to the latter by a binding-screw 71''; said angular member 71, by its positions, longitudinally of the angle-face 70', thus serving to adjust the retaining face 70, relatively to the guideway 69, in order to secure the proper relation of said parts to form a slideway, effective to prevent a bodily transverse movement of the carriage 100, relative thereto. The oscillation of the member 101, of the carriage 100, if from the frame F, effects a meshing of the rack 68, with the pinion 67; and, conversely, if such oscillation be toward the frame F, said pinion and rack become unmeshed; in which latter event, the carriage is returnable to its prime, or line-beginning position, by means of a flexible member, hereinafter referred to and shown as a tape 81, which may be attached to the carriage 100, near a point which may be considered the left end thereof; the machine being in a normal position relative to a personal operator. The tape 81, may be kept taut by a spring operated disk 77, and thus may also maintain a close contact of connected elements comprised in the letter-spacing mechanism, and neutralize possible adverse effects arising from back-lash therein. The tape 81, and disk 77, will be hereinafter more fully described.

Referring now, more particularly, to Figs. 23 to 28, inclusive, it will be seen that, in order to insure an absolutely positive limitation of movement of the carriage 100, in the direction involving letter-spacing, and to prevent the momentum of moving parts from causing a continuance of their movement beyond a normal point, the star-wheel arms 63', consecutively engage an angular detent 72, which is pivoted at 72$^b$, to the bed-plate F'. One arm 72', of said detent 72, is, practically in an approximately vertical position when at zero, and the other arm 72'', contacts with an adjusting screw 72''', which may be tapped into the bed F', and serves to regulate the amount of movement of the detent 72, in its effective direction; toward which it is returnably urged by a spring 72$^a$, Fig. 23. The rotatory motion of the star-wheel 63 is right-handed, or as from North to East. In moving in such direction, the arms 63' contact with a back-stop 73, which is pivoted at 74', to a bracket 74, which is secured to the bed F'. The back-stop 73, is of such form that it may lie partly in and partly out of the path of the arms 63', being returnably held in such position by a spring 74'''. A toe 73' on the back stop 73, engageable with a cross-pin 74'', in the bracket 74, limits the movement, in one direction, of the back-stop 73, to a position in which the free end of the latter may contact in turn, with one side of each several arm 63', of the star wheel. When the star-wheel 63, is partially rotated, an arm 63' frictionally engages the upper surface of the back-stop 73, and depresses the latter below the path of the former; but when the arm 63', passes the back-stop 73, and the latter is released from contact with the former, the back-stop 73 is returned, by the spring 74''', into the path of said arm 63', in which it is retained by the contact of the toe 73', with the cross-pin 74'', and thus prevents a backward movement of the star wheel 63, by the arm 72', of the detent 72, which is returnably urged to a position in which its arm 72'' contacts with the adjustable stop-screw 72'''. The base F' may be slotted, as at F'', to allow a passage for the body of a binding-screw 74ª, which secures to said base F', the bracket 74, on which the back-stop 73, is mounted; the latter being thus rendered adjustable relative to the detent-arm 72'.

By the combined operations of the star-wheel 63, detent 72, back-stop 73, springs 72ª, and 74''', stop-screw 72'''' and adjustable bracket 74, and the wheel train from the star-wheel 63, to the rack 68, on the carriage 100, the letter-spacing movement of the latter may be limited with precision and also be adjusted with exactitude; the latter result being attained by severally adequately and compensatorily adjusting the stop-screw 72'''', and the bracket 74, carrying the back-stop 73.

In my present invention, means are provided, (see again, more particularly, Figs. 9 and 10, and 30 to 35, inclusive,) for both automatically and manipulatively engaging and disengaging the letter-spacing mechanism of the carriage, and also, as before alluded to, (see Figs. 4, 11 and 18,) of automatically effecting a return of the carriage 100, to a prime, or line-beginning position, when said letter-spacing mechanism has been disengaged, as aforesaid. In the form shown herein as an illustration thereof, a cylindrical stud 75, having a head 75', and a threaded portion 75'', is screwed into a lug on the frame F above which the stud 75 projects, and against the lower portion of which the head 75' contacts. A sleeve 76, rotatably mounted on the stud 75, may, in general terms, be described as a cylindrical body having a flange 76' thereon, and a shoulder 76'', formed by a reduction in diameter of a portion of said body. A disk 77, is rotatably mounted on the sleeve 76, and is counter-bored to fit over the flange 76', against which it contacts. A coiled spring 78, mounted on and coiled about the sleeve 76, may have the inner end thereof attached to the sleeve 76, by a pin 78', and the other end thereof attached to a worm wheel 79, by a pin 77'. Resting on the shoulder 76'', is the worm-wheel 79; rotated by a worm threaded member 80, which is rotatably mounted in the machine frame F, and is furnished with a knurled head 80'. To the disk 77, is attached an end of a flexible member, such, for instance, as a tape 81, which may be coiled upon the periphery of said disk 77, and may be attached, at its other end, to the pendent-member 101, of the carriage 100, as hereinbefore stated. Requisite tension of the tape 81, may be maintained by adjusting that of the spring 78, by rotating, by means of the knurled head 80', the worm-threaded member 80; which, in turn would rotate the worm-wheel 79, and the sleeve 76, to which the inner end of the coiled spring 78 is attached by means of the pin 78'. The spring 78, being properly tensioned, tends to rotate the disk 77, which, in rotating will wind upon its periphery, the tape 81, which is attached to the pendent-member 101, of the carriage 100, and will thus continuously urge the latter toward its prime, or line-beginning position, namely at the extreme limit of its movement at the right of the machine, the latter being considered in its normal position relative to a personal operator; in which position the machine will be assumed to rest, relative to the directional terms herein used.

In Fig. 4 a compound or tandem tension spring is shown for applying tension to the drum 77. In this instance the spring 78 is fast to the sleeve 76 and engages a pin 79' carried by the member 79, and the spring 78'' is fast to the sleeve 76 and also engages a pin 77'' carried by the drum 77. By this means both of the springs will act in harmony and space is economized in this structure.

The several means for effecting the engagement of the line-spacing mechanism, and for disengaging the same, both of which operations may be performed either automatically or manipulatively; and means for retaining said mechanism in engagement, may be described as follows:—

On the pendent member 101, (see now, more particularly, Figs. 9, 10, broken lines in 11, and 30 to 37, inclusive,) of the carriage 100, and lying longitudinally thereof, is a locking-member 82, which may consist of a rib 82', integral with the carriage; and of two guide-blocks 84 and 85. The locking-rib 82', may be either rectangular in cross-section as shown, or of any suitable form adapting it to effect a transverse locking engagement of either of its sides with a suitable contacting member; such, for instance, as is shown herein as a spring-returned reciprocatable guide-pin 83, (more particularly shown in Figs. 2ª and 2ᵇ,) mounted in the frame F.

The guide-pin 83, may be formed as a cylindrical member, having a contact projection 83', body 83'', and a stem 83'''; and may be mounted, partly in a counter-bored recess 91, formed in the frame F, and partly in a counter-bored recess 92', which is formed in a cylindriform member 92, and contains a helical spring 93, which surrounds the guide-pin stem 83'''; and impinges against the shoulder of the guide-pin 83, and also against the shoulder formed in the recess 92', in the member 92. The latter is partly screw threaded externally, and screws into a female thread in the recess 91. The contact-projection 83', from the guide-pin 83, may preferably be rhomboidal in cross-section, and the end thereof may be slightly rounded longitudinally of the rhomboid, and angular transversely thereof; such conformation being adapted to properly contact with the several coacting parts of the locking-member 82.

After being depressed, as before-mentioned, the guide-pin 83, will be returned by the spring 93; the pressure of which may be regulated by screwing, in one or the other direction, the member 92. The interrelation of these several parts with the pinion 67, and the toothed-rack 68, is such, that an engagement of the guide-pin 83, on the inner side of the locking-member 82, maintains a meshing engagement of said pinion 67, and rack 68, and an engagement of the guide-pin 83, on the outer side of the locking-member 82, prevents the rack 68, from engaging with the pinion 67. In order to provide for a transverse movement of the locking member 82, from one side of the guide-pin 83, to the other side thereof, passages for the latter may be formed across the locking-member 82.

For reasons which will appear later on, the locking rib 82' as shown (see Figs. 30 and 31) is supplemented in two several portions of its length, by two, several members, in which rest, in addition to others, the functions of said locking-rib 82'; said members being herein severally shown and described as the before-mentioned guide blocks 84 and 85. Both of these guide-blocks may, if required, be shiftable longitudinally of the locking-rib 82, but as shown herein, the block 84 is fixed relatively to the rib 82, while the block 85, is shiftable, as aforesaid. These blocks are, longitudinally, angular in form, their apices lying toward each other, and are severally formed with offsets, respectively shown as 84', 85', which are severally mounted on and are, practically, continuations of the locking-rib 82'; and, in effect, throughout their several lengths, the guide-blocks 84, 85, functionally supersede equal portions of said locking rib 82'. Of the guide block 84, the side outward from the frame F, and of the guide-block 85, the side toward said frame, are, severally, in line with the inner and outer sides respectively of the locking-rib 82'; and, similarly therewith and continuously thereof, form locking-faces, of which, those of the guide-blocks 84, 85, are herein shown as 84", 85", and those of the locking-rib 82', as 82". These locking-faces may, in required turn, engage and be guided by the contact-projection 83' from the guide-pin 83, and thus lock the rack 68, mounted on the pendent member 101, either into or out of mesh with the pinion 67. Throughout the movements of the carriage 100, transversely of the machine, the angularly formed extremity of the contact-projection 83', of the guide-pin 83, may contact singly with any one of four guide faces, two of which 82''', are severally formed, one on either side respectively of the locking rib 82', the remaining two 84''', 85''' being severally formed one on one side and one on the other side of the guide-blocks 84, 85, respectively; said guide faces being, in form, adapted to contact with the extremity of the contact-projection 83; the guide faces 82'''' lying parallel with the locking-rib 82', and the guide-faces 84''', 85''', lying angularly therewith, and, in their general direction severally leading to transverse passages, severally formed, as at 84ª, 85ª, across each guide-block 84, 85, respectively; thus allowing a shifting of the latter across the guide-pin 83. The respective faces of the guide-blocks, at the transverse-passages 84''', 85''', are beveled so as to induce transverse movements of the respective guide-blocks across the guide-pin 83, and, thereby, to oscillate the pendent member 101, the carriage 100, and all parts mounted thereon. Thus, should the guide-pin 83, engage and traverse the guide face 84", and the transverse-passage 84''', be thus brought opposite the guide-pin 83, the pendent member 101, will so oscillate as to cause the rack 68, to mesh with the pinion 67; but should the guide-pin 83, engage and traverse the guide-block 85, and the transverse passage 85''', be brought opposite the guide pin 83, the pendent member 101, will so oscillate as to cause the rack 68, to unmesh from the pinion 67. Additional means are, however, provided to effect the before-described oscillation of the carriage; and comprise in part, a spring 89, mounted on the frame F, and adapted to be tensioned by the contact of an anti-friction roller 89', mounted on a bracket 89", secured to the pendent member 101, as the carriage 100 approaches its prime, or line-beginning position at the right. The carriage 100, having reached said position, and, as before shown, the guide-pin 83, being opposite the transverse passage 84''', the spring 89, urges the pendent member 101, away from the frame F, and thus meshes the rack 68, with the pinion 67. When, however, at any time, the guide pin 83, may be in the transverse passage 85''', as when the carriage 100, is at the extreme limit of its motion to the left-hand position as at the ending of a line of impressions; the coiled-spring 78, and tape 81 will draw the pendent member 101, toward the frame F, thus unmeshing the rack 68, from the pinion 67; continued action of the coiled spring 78, and tape 81, serving to return the carriage to the right, as hereinbefore described. The bracket 89", may at its extreme right-hand position, contact an abutment 89''', integral with the frame F, and thus act as a limit stop, in one direction, for the carriage 100.

The guide-block 85, is herein shown as being shiftably mounted on the locking-rib 82', and by shifting said guide-block in one or the other direction, an adjustment may be effected, of the length of the lines to be impressed or printed. Means are provided for retaining said guide block in any position to which it may be shifted, and may comprise a locking-pin 86, attached to a spring 87, which is secured to the guide-block 85, by a screw 87'. The pin 86, may engage with any one of a plurality of holes 88, formed in a longitudinal line in the locking-rib 82; said holes 88, being, preferably, separated by distances severally equal to a letter-space.

A manipulative member (see Figs. 2, 2ª and 2ᵇ,) shown herein as a push-pin 90, which is reciprocatably mounted in the frame F; and bent to an angle, engages at said angle with the guide-pin 83. By the depression of said push-pin 90, by means of a finger piece 90', mounted thereon, the disengagement of the guide-pin 83, from the locking-rib 82, or from the guide-blocks 84, or 85, severally, may be effected; the push-pin 90, being, thereafter, returned by a spring 90'''.

A hand-piece 94, (see Figs. 1 and 12,) may be fixedly mounted on the carriage 100, and the latter may be manipulatively shifted thereby, longitudinally of the guideway 69; and also oscillatively thereon, provided that the guide-pin 83, has previously been disengaged from the locking-member 82.

Having described my invention, I claim—

1. The combination, with a traversing mechanism embodying a carriage, of a rotary carrier or turret, a part mounted thereon; an axially movable shaft to which said part is secured; and means for moving said carriage actuated by said shaft.

2. The combination, with a traversing mechanism embodying a carriage, of a rotary carrier or turret, a part mounted thereon; an axially movable shaft; and means for moving the carriage actuated by the end of said shaft.

3. The combination, in a traversing mechanism, of a carriage provided with a longitudinal rib; a pin adapted to be located upon one side or the other of the rib according as the carriage travels in one direction or the other, the rib having a transverse groove at one end and a spring for swinging the carriage upon its support.

4. The combination, in a traversing mechanism, of a carriage provided with a longitudinal rib; a depressible pin adapted to be situated upon one side or the other of the rib according as the carriage travels in one direction or in the other; and a spring for swinging the carriage across said rib.

5. The combination, in a traversing mechanism, of a depressible pin, a carriage provided with a rib forming a groove on each side thereof through which the pin slides, each groove being inclined at one end and entering a transverse passage extending across the rib.

6. The combination, in a traversing mechanism, of a depressible pin, a carriage provided with a rib forming a groove on each side thereof through which the pin slides, each groove entering a transverse passage extending across the rib and one of said grooves terminating in an adjustable block.

7. The combination, in a traversing mechanism, of a depressible pin, a carriage provided with a rib forming a groove on each side thereof through which the pin slides, each groove being inclined at one end and entering a transverse passage extending across the rib, one of said grooves terminating in an adjustable block.

8. The combination, in a traversing mechanism, of a depressible pin, a carriage provided with a rib forming a groove on each side thereof through which the pin slides, and a pinion for traversing said carriage normally held by said pin in engagement with a rack upon the carriage when located in one of the grooves but permitting the carriage to be swung away from the pinion by gravity when depressed.

9. The combination, in a traversing mechanism, of a depressible pin, a carriage provided with a rib forming a groove on each side thereof through which the pin slides, each groove terminating in a transverse passage, and a pinion for traversing said carriage normally held by said pin in engagement with a rack upon the carriage when located in one of the grooves but permitting the carriage to be swung away from the pinion by gravity when depressed.

10. The combination, in a traversing mechanism, of a depressible pin, a carriage provided with a rib forming a groove on each side thereof through which the pin slides, each groove terminating in a transverse passage, a pinion for traversing said carriage normally held by said pin in engagement with a rack upon the carriage when located in one of the grooves, and a spring with which the carriage contacts adjacent to one end of its movement to automatically swing the carriage transversely when the pin comes opposite one of said transverse passages, the carriage being moved by gravity in a reverse direction when the pin is opposite the other transverse passage.

11. The combination with a traveling carriage, of a feed roll mounted thereon; means for turning the feed roll immediately preceding an extreme position of the carriage; means for automatically causing the carriage to swing upon its supports at each extreme position thereof; a traversing pinion and rack adapted to engage at one extreme position of the carriage and to disengage at the other extreme position; and a spring for turning the carriage when the pinion and rack are disengaged.

12. A return device for a traveling carriage comprising, in combination, a drum, a band or tape connecting the carriage with the drum, a spring for rotating said drum, and a second spring co-operative therewith for augmenting the tension thereof.

13. A return device for a traveling carriage, comprising, in combination, a stud, a sleeve rotatively mounted upon the stud, a drum rotatively mounted upon the sleeve, a band or tape connecting the carriage with the drum, a spring secured at one end to said drum and at the other to said sleeve, a worm wheel rotatively mounted upon the sleeve, a screw or worm for turning said worm wheel, and a second spring secured at one end to said worm wheel and at the other end to said sleeve.

14. The combination with a longitudinally movable carriage mounted to swing laterally to the direction of its longitudinal movement, of a carriage-actuating mechanism with which the carriage may be swung into and from which the carriage may be swung out of operative engagement, by means of engagement of a switch rib on the carriage with a switch pin on the frame.

15. The combination with a longitudinally movable carriage provided with a longitudinal rib and a switch pin on the frame for engagement with the rib, and a guide rod on which the carriage is mounted to swing laterally to the direction of its longitudinal movement, of an actuating mechanism with which the carriage may be swung into and from which the carriage may be swung out of operative engagement.

16. The combination with a longitudinally movable carriage provided with a longitudinal rib and a switch pin on the frame for engagement with the rib, and a guide rod on which the carriage is mounted to swing laterally to the direction of its longitudinal movement, of an actuating mechanism relatively to which the carriage at one end of its stroke is swung by gravity in one direction and a spring for swinging the carriage at the opposite end of its stroke in the opposite direction.

17. The combination with a longitudinally movable carriage, a guide rod on which the carriage is mounted to swing laterally to the direction of its longitudinal movement, and an adjustable opposed guide, of an actuating mechanism with which the carriage may be swung into and from which the carriage may be swung out of operative engagement, by means of engagement of a switch rib on the carriage with a switch pin on the frame.

18. The combination with a longitudinally movable carriage provided with a longitudinal rib and switch pin on the frame for engagement with the rib, a guide rod on which the carriage is mounted to swing laterally to the direction of its longitudinal movement, and an adjustable opposed guide, of an actuating mechanism relatively to which the carriage at one end of its stroke is swung by gravity in one direction, and a spring for swinging the carriage at the opposite end of its stroke in the opposite direction.

19. The combination with a longitudinally movable carriage provided with a longitudinal rib, of a guide rod on which the carriage is mounted to swing laterally to the direction of its longitudinal movement, an actuating mechanism with which the carriage may be swung into and from which it may be swung out of engagement, a pin along which one side of said rib is adapted to travel when the carriage is engaged with its actuating mechanism and along which the other side of said rib is adapted to travel when the carriage is disengaged from its actuating mechanism, and means for shifting said pin from one side of said rib to the opposite side thereof at each end of the carriage stroke.

20. The combination with a longitudinally movable carriage provided with a longitudinal rib, of a guide rod on which the carriage is mounted to swing laterally to the direction of its longitudinal movement, an actuating mechanism with which the carriage may be swung into and from which it may be swung out of engagement, a pin along which one side of said rib is adapted to travel when the carriage is engaged with its actuating mechanism and along which the other side of said rib is adapted to travel when the carriage is disengaged from its actuating mechanism, means for shifting said pin from one side of said rib to the opposite side thereof at each end of the carriage stroke, and a finger piece for withdrawing said pin from engagement with the rib in any intermediate position of the carriage.

21. The combination with a longitudinally movable carriage provided with a longitudinal rib forming a guide-way on each side thereof, one guide-way terminating in an inclined plane adjacent to one end of the carriage and the other guide-way in a similar inclined plane adjacent to the other end of the carriage and which guide-ways are connected with each other at the two ends of the carriage, of a depressible pin adapted to travel in said guide-ways, and means for shifting the pin from one guide-way to the other at each end of the carriage stroke.

22. The combination with a longitudinally movable carriage provided with a longitudinal rib forming a guide-way on each side thereof, one guide-way terminating in an inclined plane adjacent to one end of the carriage and the other guide-way in a similar inclined plane adjacent to the other end of the carriage and which guide-ways are connected with each other at the two ends of the carriage, of a member on which one of said inclined planes is formed and which is adjustable longitudinally of the carriage, a depressible pin adapted to travel in said guide-ways, and means for shifting the pin from one guide-way to the other at each end of the carriage stroke.

23. The combination with a longitudinally movable carriage provided with a longitudinal rib forming a guide-way on each side thereof, one guide-way terminating in an inclined plane adjacent to one end of the carriage and the other guide-way in a similar inclined plane adjacent to the other end of the carriage and which guide-ways are connected with each other at the two ends of the carriage, of a depressible pin adapted to travel in said guide-ways, and means comprising a spring for shifting the pin from one guide-way to the other at each end of the carriage stroke.

24. The combination with a longitudinally movable carriage provided with a longitudinal rib forming a guide-way on each side thereof, one guide-way terminating in an inclined plane adjacent to one end of the carriage and the other guide-way in a similar inclined plane adjacent to the other end of the carriage and which guide-ways are connected with each other at the two ends of the carriage, of a guide-rod upon which the carriage is mounted to swing laterally to the direction of its longitudinal movement, a depressible pin adapted to travel in said guide-ways, and means for shifting the pin from one guide-way to the other at each end of the carriage stroke.

25. The combination with a longitudinally movable carriage provided with a longitudinal rib forming a guide-way on each side thereof, one guide-way terminating in an inclined plane adjacent to one end of the carriage and the other guide-way in a similar inclined plane adjacent to the other end of the carriage and which guide-ways are connected with each other at the two ends of the carriage, of a depressible pin adapted to travel in said guide-ways, means for shifting the pin from one guide-way to the other at each end of the carriage stroke, a rack on the carriage, a pinion engageable with and disengageable from the rack, and feed mechanism for controlling the movement of said pinion.

26. The combination with a longitudinally movable carriage provided with a longitudinal rib forming a guide-way on each side thereof, one guide-way terminating in an inclined plane adjacent to one end of the carriage and the other guide-way in a similar inclined plane adjacent to the other end of the carriage and which guide-ways are connected with each other at the two ends of the carriage, of a depressible pin adapted to travel in said guide-ways, means for shifting the pin from one guide-way to the other at each end of the carriage stroke, a rack on the carriage, a pinion engageable with and disengageable from the rack, feed mechanism for controlling the movement of said pinion, and a finger piece for withdrawing the said pin from the guide-ways.

27. The combination with a longitudinally movable carriage, a rack thereon and a carriage retracting spring, of a pinion engageable with the rack, a star wheel for imparting an intermittent movement to the pinion, and continuously movable crank mechanism for imparting intermittent movement to the star wheel at predetermined intervals.

28. The combination with a longitudinally movable carriage, a rack thereon and a carriage retracting spring, of a pinion engageable with the rack, a star wheel for imparting an intermittent movement to the pinion, crank mechanism for imparting an intermittent movement to the star wheel, at predetermined intervals, and locking devices for locking the star wheel in each of its angular positions.

29. The combination with a longitudinally movable carriage provided with a longitudinal rib, of a longitudinally reciprocating pin mounted in the frame for lateral engagement with said rib, said carriage mounted to swing laterally to the direction of its longitudinal movement, of a carriage actuating mechanism with which the carriage may be swung into and from which the carriage may be swung out of operative engagement.

30. The combination with a longitudinally movable carriage, a rack thereon and a carriage retracting spring, of a pinion engageable with the rack, a star wheel for imparting an intermittent movement to the pinion, crank mechanism for imparting an intermittent movement to the star wheel, and means for automatically moving the rack out of engagement with the pinion.

31. The combination with a longitudinally movable carriage mounted to swing laterally to the direction of its longitudinal movement, and a switch rib on the carriage, of a carriage-actuating frame with which the carriage may be swung into and from which the carriage may be swung out of operative engagement, and a switch pin on the frame for engaging the said switch rib.

32. The combination with a longitudinally movable carriage, a rack thereon, and a carriage retracting spring, a pinion engageable with the rack, means for effecting the engagement of the pinion and rack, a star wheel for imparting an intermittent movement to the pinion, crank mechanism for imparting an intermittent movement to the star wheel, and means for automatically moving the rack out of engagement with the pinion.

33. The combination with a reciprocatory carriage, of an intermittently movable actuator therefor, a locking member carried by the carriage and movable transversely of the line of reciprocation thereof, a contacting member for engaging the locking member and causing the same to reciprocate in either of two parallel paths, and means movable with the locking member for engaging said actuator during its travel along one only of said paths.

34. The combination with a reciprocatory cariage, of a locking member carried by the carriage and movable transversely of the line of reciprocation thereof, a contacting member for engaging the locking member and causing the same to traverse either of two parallel paths, an intermittently movable actuator for advancing the carriage, means movable with the locking member for engaging said actuator during its movement along one only of said paths, means for permitting said locking member to move said engaging means out of engagement with said contacting member at the completion of a predetermined length of travel along said path, means for returning the carriage to initial position, and a spring for moving the locking member and the engaging means into position for the latter to engage the actuator.

FRANCIS H. RICHARDS.

Witnesses:
FRED. J. DOLE,
JOHN O. SEIFERT.